Patented Sept. 18, 1945

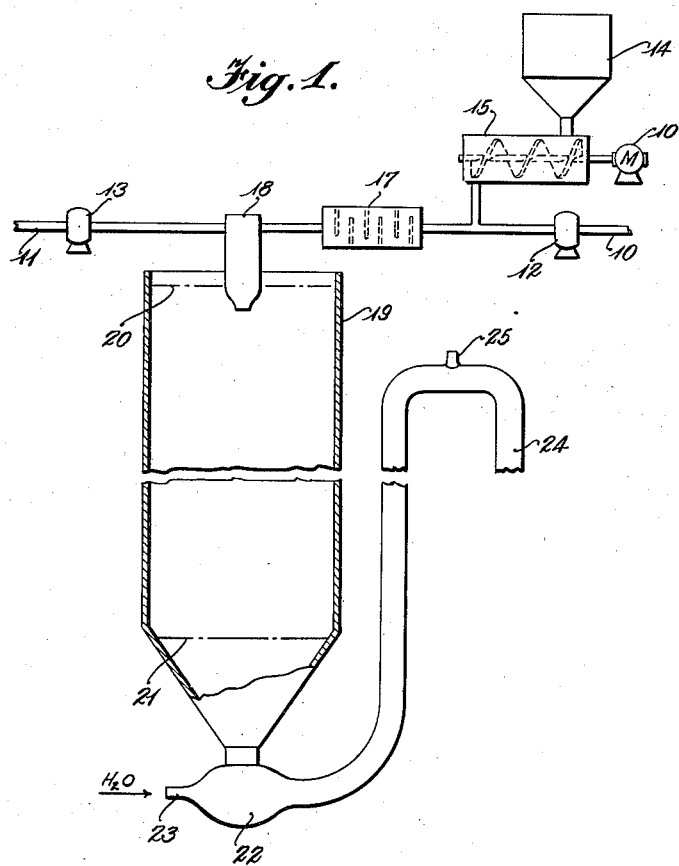
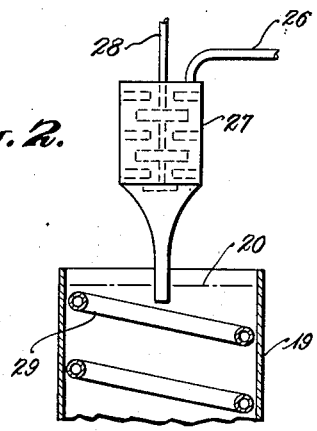

2,384,945

UNITED STATES PATENT OFFICE 2,384,945

SPHEROIDAL GEL PARTICLES

Milton M. Marisic, Woodbury, N. J., assignor to Socony-Vacuum Oil Company, Incorporated, a corporation of New York Application April 19, 1944, Serial No. 531,814

9 Claims. (Cl. 252—317)

This invention relates to spheroidal bodies of inorganic oxide gels containing masses foreign to the gel structure. This application is a continuation in part of my prior copending application Serial No. 491,544, filed June 19, 1943.

My said prior application describes a process for forming composite hydrogel spheroids by incorporation with a gelable sol of pulverized dried gels and other matter foreign to said sol. The sol is then injected into a body of water immiscible liquid wherein the sol separates into a plurality of globules which set to firm hydrogel spheroids in the liquid. Primarily, the said prior case is directed to formation of globules having a core of foreign matter surrounded by a shell of hydrogel. In addition, it is disclosed in said application that a foreign body may be included in the finished hydrogel by suspending it in one of the reactant solutions used to form the gelable sol or in the sol before gelation occurs. This latter concept is the basis of the present application.

Prior to the work of the present applicant, dried porous inorganic oxides for use as catalysts, adsorbents and the like, including partially dried bodies used for zeolytic base exchange in water purification, had been prepared according to one of three well defined methods. The Patrick process involves addition of a solution, such as water glass, to acid to produce a sol which sets to a firm hydrogel in a period of several hours. These gels are prepared at high acidity, more acid than pH 1. Porous bodies are also prepared by precipitation by adding acid to such solutions as water glass or water glass containing an aluminum salt. The precipitate is soft and readily separated by filtration from the aqueous liquor. A third process involves mixing solutions in such manner that gelatinous precipitates are formed and included in a gel which sets up immediately upon reaching a certain value of concentration and pH. These methods are not suited to formation of smooth surfaced spheroidal particles by injection of sol to a body of water immiscible liquid. The gelation time of the Patrick gels is too long, gelatinous precipitates will not form globules and the mixed precipitate and gel sets up immediately, giving no time for globule formation.

I have now perfected a method which, in some of its embodiments, is similar to mixed gel and precipitate formation in that bodies foreign to the gel are included in the gel structure as occlusions. By this method, I am able to prepare a wide variety of composite bodies having the characteristic smooth hard surfaces and spheroidal shape of gels formed as globules in an immiscible liquid. The foreign substances included in the gel globules may serve a number of purposes. In catalytic gels, the added substance may be a catalyst modifier or may itself be catalytic, such as finely divided metals, oxides, sulfides, etc. The added substance may be added for its thermal effect, thus inert bodies of high specific heat may be added to cracking catalysts to aid in temperature control on regeneration. Metals, quartz, alundum, glasses, etc., may be used for this purpose. Where the gel is to be used for zeolytic water softening, a different type of base exchange material may be occluded; for example an anion exchanging resin may be incorporated in a cation exchanging silica-alumina gel.

The added substance may be utilized to modify porosity and other physical characteristics. Liquids, gases and combustible solids may thus be added to cause large pores to occur in the finished spheroids after drying, burning or other suitable treatment. A more highly porous or less porous substance such as a precipitate or gel of different porosity may be occluded. The dispersion of gases in the sol is described in my copending application Serial No. 461,454, filed October 9, 1942.

These objects and advantages of the invention are obtained by effecting dispersion in a gelable sol of particles immiscible with the sol, injecting the sol to a body of a liquid immiscible therewith and retaining the so formed globules of sol in the liquid until gelation takes place. Thereafter the hydrogel spheroids are removed from the liquid and treated, as by washing and drying, to yield the desired product. Other objects and advantages of the invention will appear from consideration of preferred embodiments of the invention discussed below in connection with the annexed drawings, wherein:

Figure 1 is a diagrammatic representation of apparatus for practicing the invention, and Figure 2 is a modified type of apparatus for mixing a separate phase with pre-formed gelable sol.

Referring specifically to Figure 1, a gel in spheroidal form may be prepared with dispersion of a powdered solid therein by adding the solid to one of the reactant solutions mixed to form a gelable sol. For purposes of illustration, Figure 1 may be considered in connection with preparation of a silica-alumina cracking catalyst in spheroidal form containing a dried and powdered silica-alumina gel of the same or different nature. Two solutions are mixed together to prepare a sol in this process. One of the solutions is a dilute water glass and the other is acid. A water soluble aluminum compound is incorporated in one or both of these two solutions, e. g., aluminum sulfate in the acid or sodium aluminate in the water glass. To one of these solutions, a finely divided, preferably powdered, dried silica-alumina gel is added. Preferably, the powdered dry gel is added to the water glass; since the acid solution tends to dissolve alumina and will thus affect the dry gel in a manner which is disadvantageous for some purposes.

In the apparatus of Figure 1, water glass and acid solutions are supplied in predetermined relative amounts by pipes 10 and 11 and metering pumps 12 and 13, respectively. A powdered dry silica-alumina gel from hopper 14 is supplied to line 12 by worm feed 15 driven by motor 16. Usually, worm feed 15 will be so operated as to supply the powdered gel at a predetermined constant rate. The mixture of powdered gel and water glass is then passed through a dispersing device, such as baffled chamber 17 in order to disperse the powdered gel uniformly through the water glass solution.

The dispersion of powdered gel in water glass is then efficiently mixed with acid solution in mixing nozzle 18 and injected into the top of a forming tower 19 containing a liquid immiscible with water, for example, a light petroleum distillate. As indicated at 20, the level of the oil is generally above the nozzle opening. In the oil, the sol separates into spheroidal globules which fall through the oil and set to a firm hydrogel before passing through an interface 21 into a layer of water below the oil. The gel spheroids then are picked up by a stream of water in a chamber 22, supplied by pipe 23, and carried in said stream through a goose-neck 24 which is vented to the atmosphere through vent 25 at a level to maintain level 20 of the liquid in forming tower 19.

Alternatively, the gelable sol may be made up and the foreign body dispersed therein before injection to the oil column. The apparatus of Figure 2 is particularly adapted to practice of that embodiment of the invention. A sol having a suitable gelation time is supplied by pipe 26 from a source, not shown, which may be identical with mixing nozzle 18 except that a pipe is connected to the discharge opening. The sol is passed to an agitator 27 where it is thoroughly mixed with a separate phase which may be introduced to line 26 by a worm feed as in Figure 1. A series of fixed vanes and rotatable vanes, carried by driven shaft 28, efficiently mix the sol with the added material in agitator 27 and the mixture is then injected below the level 20 of an oil column in chamber 19.

This type of dispersion is very satisfactory for introduction of a liquid or gaseous material to the sol. Fluids may be supplied under pressure to a hollow shaft 28 to be injected through openings in the shaft and/or the vanes mounted thereon.

When dispersing a separate phase into a preformed sol, it is advisable to use a sol having a relatively long gelation time to avoid gel formation in the agitator. This does not necessarily mean that the oil column must be proportionately deep since the gelation time decreases with increasing temperature and the sol may be introduced to an oil column of elevated temperature whereby it is heated and caused to gel in a relatively short time. A heating coil 29 is shown in chamber 19 of Figure 2 for that purpose. If a concentrated gel is desired, the reacting solution may be cooled to near freezing temperatures and maintained at that level until injected to the oil, which may in that case be at room temperature, if desired.

The nature of the process is further illustrated by specific examples given below, it being understood that the nature of the foreign matter introduced according to any of the examples may be varied within the scope of the invention as discussed generally above.

Example 1

A solution of sodium silicate containing 105 grams of $SiO_2$ per liter was prepared by diluting "N" brand of sodium silicate (28.7% $SiO_2$, 8.9% $Na_2O$). This solution was passed through an agitating device with 200 grams per liter of 80–100 mesh dried silica alumina gel prepared by crushing the product of previous similar process in which a foreign material was not added. Thereafter the dispersion was mixed with a second solution containing 34.10 grams of $Al_2(SO_4)_3$ and 25.05 grams of $H_2SO_4$ per liter at the ratio of 1.00 volume of the former solution to 0.780 volume of the latter. The resulting colloidal solution leaving the mixer through orifices was introduced into the top of a column of gas oil whose depth was eight feet. The globules of solution fell through the oil and gelled before passing into the layer of water located beneath the oil. The gel in the globular form was conducted out of the bottom of the column in a stream of water and on removal from the water, it was washed with petroleum naphtha to remove oil from its surface. It was then washed with water and $NH_4Cl$ solution to replace zeolitically-held sodium ions by ammonium ions which are capable of being driven off as $NH_3$ gas by heat. The gel was dried slowly and uniformly at 180° F. until shrinkage was substantially complete and the drying was continued at a gradually increasing temperature up to 1050° F. at which temperature it was maintained for two hours. The silica-alumina gel retained its spheroidal shape during the washing and drying operations.

The time of gelation for the concentration and proportions of reactants given above was about ten seconds, while the pH was 6.9. The gas oil employed was a fraction of Oklahoma City Gas Oil having a boiling range of 471° to 708° F. and a specific gravity of 0.846.

Example 2

This run was conducted according to the process outlined in Example 1 except that one volume of air was agitated with three volumes of the first solution before mixing with the acid solution. The product after washing and drying had a much lower apparent density and higher porosity, but was otherwise identical with the product in which no air was added.

Example 3

A solid cracking catalyst was made according to the process of Example 2 except that the air was injected directly into the mixing nozzle. A product essentially the same as that of Example 2 was produced.

Example 4

This example illustrates the effect of cooling the solutions mixed to form the gelable sol and mixing a foreign phase with the sol before injecting to the forming column. The silicate solution and acid of Example 1 were cooled to 40° F. and efficiently mixed. At this temperature, the sol had a gelation time greater than one hour. The sol was then passed to an agitator (Figure 2) wherein one volume of gas oil was efficiently disposed in ten volumes of sol. The dispersion was promptly injected through orifices to a column of oil maintained at about 80° F. resulting in formation of composite spheroids of about 10 mm. average diameter each containing a plurality of occluded oil droplets. (It is noted that a gas or liquid dispersed in a gelable sol shows some tendency to move to a globule surface and be lost. In some cases slight dispersions remain in the surface of the spheroidal hydrogel particles.) The hydrogel of this example was washed and dried as above and then contacted with air at about 1050° F. to burn out residual carbonaceous material leaving a product very similar to that of Example 2.

All the products described above were found to be excellent catalysts for cracking of hydrocarbon oils and to have excellent characteristics for regeneration by burning.

I claim:

1. A process for making spheroidal particles of inorganic oxide gels modified by inclusion of substances forming discontinuities in the gel mass which comprises preparing a gelable aqueous sol of at least one water-insoluble inorganic oxide, effecting dispersion in said sol of small amounts of a gas insoluble in said sol whereby the said gas is dispersed through the sol as particles of a phase discontinuous with the sol, injecting said sol containing said dispersed gas into a body of a water-immiscible liquid whereby the sol is caused to take the form of a plurality of separate substantially spheroidal globules, retaining said globules in said liquid until gelation of said sol has occurred and thereafter removing the globules of hydrogel so formed; said small amounts of said gas being of such size and quantity that the major proportion of said hydrogel globules will include a plurality of said particles of said gas.

2. A process for making spheroidal particles of silica containing gels modified by inclusion of substances forming discontinuities in the gel mass which comprises preparing a gelable aqueous sol containing silica, effecting dispersion in said sol of small amounts of a gas insoluble in said sol whereby the said gas is dispersed through the sol as particles of a phase discontinuous with the sol, injecting said sol containing said dispersed gas into a body of a water-immiscible liquid whereby the sol is caused to take the form of a plurality of separate substantially spheroidal globules, retaining said globules in said liquid until gelation of said sol has occurred and thereafter removing the globules of hydrogel so formed; said small amounts of said gas being of such size and quantity that the major proportion of said hydrogel globules will include a plurality of said particles of said gas.

3. A process for making spheroidal particles of silica alumina gels modified by inclusion of substances forming discontinuities in the gel mass which comprises preparing a gelable aqueous sol containing silica and alumina, effecting dispersion in said sol of small amounts of a gas insoluble in said sol whereby the said gas is dispersed through the sol as particles of a phase discontinuous with the sol, injecting said sol containing said dispersed gas into a body of a water immiscible liquid whereby the sol is caused to take the form of a plurality of separate substantially spheroidal globules, retaining said globules in said liquid until gelation of said sol has occurred and thereafter removing the globules of hydrogel so formed; said small amounts of said gas being of such size and quantity that the major proportion of said hydrogel globules will include a plurality of said particles of said gas.

4. A process for making spheroidal particles of inorganic oxide gels modified by inclusion of substances forming discontinuities in the gel mass which comprises preparing a gelable aqueous sol of at least one water insoluble inorganic oxide, effecting dispersion in said sol of small amounts of a gas insoluble in said sol whereby the said gas is dispersed through the sol as particles of a phase discontinuous with the sol, injecting said sol containing said dispersed gas into a body of a water immiscible liquid whereby the sol is caused to take the form of a plurality of separate substantially spheroidal globules, retaining said globules in said liquid until gelation of said sol has occurred removing the globules of hydrogel so formed, washing said globules and drying the washed globules; said small amounts of said gas being of such size and quantity that the major proportion of said hydrogel globules will include a plurality of said particles of said gas.

5. A process for making spheroidal particles of silica containing gels modified by inclusion of substances forming discontinuities in the gel mass which comprises preparing a gelable aqueous sol containing silica, effecting dispersion in said sol of small amounts of a gas insoluble in said sol whereby the said gas is dispersed through the sol as particles of a phase discontinuous with the sol, injecting said sol containing said dispersed gas into a body of a water immiscible liquid whereby the sol is caused to take the form of a plurality of separate substantially spheroidal globules, retaining said globules in said liquid until gelation of said sol has occurred, removing the globules of hydrogel so formed, washing said globules and drying the washed globules; said small amounts of said gas being of such size and quantity that the major proportion of said hydrogel globules will include a plurality of said particles of said gas.

6. A process for making spheroidal particles of silica alumina gels modified by inclusion of substances forming discontinuities in the gel mass which comprises preparing a gelable aqueous sol containing silica and alumina, effecting dispersion in said sol of small amounts of a gas insoluble in said sol whereby the said gas is dispersed through the sol as particles of a phase discontinuous with the sol, injecting said sol containing said dispersed gas into a body of a water immiscible liquid whereby the sol is caused to take the form of a plurality of separate substantially spheroidal globules, retaining said globules in said liquid until gelation of said sol has occurred, removing the globules of hydrogel so formed, washing said globules and drying the washed globules; said small amounts of said gas being of such size and quantity that the major proportion of said hydrogel globules will include a plurality of said particles of said gas.

7. A process for making spheroidal particles of inorganic oxide gels modified by inclusion of substances forming discontinuities in the gel mass which comprises preparing a gelable aqueous sol of at least one water insoluble inorganic oxide, effecting dispersion in said sol of small amounts of air whereby the air is dispersed through the sol as particles of a phase discontinuous with the sol, injecting said sol containing said dispersed air into a body of a water immiscible liquid whereby the sol is caused to take the form of a plurality of separate substantially spheroidal globules, retaining said globules in said liquid until gelation of said sol has occurred, removing the globules of hydrogel so formed, washing said globules and drying the washed globules; said small amounts of said air being of such size and quantity that the major proportion of said hydrogel globules will include a plurality of said particles of air.

8. A process for making spheroidal particles of silica containing gels modified by inclusion of substances forming discontinuities in the gel mass which comprises preparing a gelable aqueous sol containing silica, effecting dispersion in said sol of small amounts of air whereby the air is dispersed through the sol as particles of a phase discontinuous with the sol, injecting said sol containing said dispersed air into a body of a water immiscible liquid whereby the sol is caused to take the form of a plurality of separate substantially spheroidal globules, retaining said globules in said liquid until gelation of said sol has occurred, removing the globules of hydrogel so formed, washing said globules and drying the washed globules; said small amounts of said air being of such size and quantity that the major proportion of said hydrogel globules will include a plurality of said particles of air.

9. A process for making spheroidal particles of silica alumina gels modified by inclusion of substances forming discontinuities in the gel mass which comprises preparing a gelable aqueous sol containing silica and alumina, effecting dispersion in said sol of small amounts of air whereby the air is dispersed through the sol as particles of a phase discontinuous with the sol, injecting said sol containing said dispersed air into a body of a water immiscible liquid whereby the sol is caused to take the form of a plurality of separate substantially spheroidal globules, retaining said globules in said liquid until gelation of said sol has occurred, removing the globules of hydrogel so formed, washing said globules and drying the washed globules; said small amounts of said air being of such size and quantity that the major proportion of said hydrogel globules will include a plurality of said particles of air.

MILTON M. MARISIC.